(12) United States Patent
Crevasse et al.

(10) Patent No.: US 6,518,987 B1
(45) Date of Patent: Feb. 11, 2003

(54) MOUSE AND MOUSE TEMPLATE FOR A MOTION IMPAIRED USER

(75) Inventors: Annette Margaret Crevasse, Apopka, FL (US); William Graham Easter, Orlando, FL (US); John Albert Maze, Orlando, FL (US); Frank Miceli, Orlando, FL (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/410,548

(22) Filed: Oct. 1, 1999

(51) Int. Cl.[7] ................................................. G09G 5/00
(52) U.S. Cl. ........................ 345/810; 345/865; 345/163
(58) Field of Search ................................. 345/700, 701, 345/727–729, 764, 810, 835, 841, 843, 856–858, 865, 156–158, 162–164, 167, 184, 905; 704/270, 270.1, 271; 434/112, 116

(56) References Cited

U.S. PATENT DOCUMENTS

| | | | | |
|---|---|---|---|---|
| 3,854,131 A | * | 12/1974 | Vanderheiden et al. | 178/17 C |
| 4,241,521 A | * | 12/1980 | Dufresne | 340/825.19 |
| 4,933,514 A | * | 6/1990 | Bowers | 178/18.01 |
| 5,223,828 A | * | 6/1993 | McKiel, Jr. | 340/825.19 |
| 5,691,748 A | * | 11/1997 | Fukuzaki | 345/173 |
| 5,831,597 A | * | 11/1998 | West et al. | 345/156 |
| 5,883,718 A | * | 3/1999 | Shu-Ming | 250/237 G |

* cited by examiner

Primary Examiner—Crescelle N. dela Torre (57) ABSTRACT

A computer system for a motion impaired user includes a housing, a processor in the housing, and a display connected to the processor for displaying at least one menu of selectable commands arranged in a sequence. A mouse is connected to the processor for positioning a pointer on the display responsive to movement of the mouse. The computer further includes a mouse template having at least one elongate body having a plurality of stations therealong corresponding to the sequence of selectable commands and cooperates with the mouse for assisting the motion impaired user so that when the mouse is positioned at a station, the pointer on the display is positioned at the corresponding selectable command of the menu.

18 Claims, 6 Drawing Sheets

MOUSE AND MOUSE TEMPLATE FOR A MOTION IMPAIRED USER

FIELD OF THE INVENTION

The present invention relates to the field of computers, and, more particularly, to a pointing device for a computer.

BACKGROUND OF THE INVENTION

A pointing device is required for a computer system having a graphics oriented operating system, such as Windows95 and WindowsNT. Consequently, computer specifications require a pointing device as basic equipment. The pointing device permits a user of the computer to control a pointer on a display for the computer system.

A mouse is one such pointing device. The mouse is a hand-held device operated on a flat surface which, in cooperation with the necessary computer hardware and software, allows the user to control movement of a cursor or pointer on the display. For example, if the user desires to move the pointer to the upper left of the display, the user properly orients the mouse on the flat operating surface, such as a table top, and pushes the mouse in the direction of the upper left corner of the display while watching the display. The pointer changes position to correspond to the relative change in position of the mouse. Thus, the user can guide the pointer to any position on the display using the mouse.

A mouse includes at least two switches, which are typically in the form of buttons. These buttons permit the user to signify to the computer to perform various functions. Typically, the left mouse button is the primary button used to select windows, pull down menus, highlight text, etc. For example, for a word processing program operating in Microsoft Windows95, a menu of selectable commands arranged in a sequence are displayed along an upper portion of the display. These selectable commands are typically pull down menus. The user positions the pointer over a desired command and depresses the left mouse button. By continuing to hold the left mouse button, a menu of additional commands are displayed for the user to select from.

Overall, operation of the mouse requires that the user have a certain level of hand motor skill control. Unfortunately, a computer user with poor motor skill control as a result of Parkinson's disease or poor eyesight, for example, has difficulty controlling his hand for positioning the pointer at a desired screen location. Nonetheless, once the desired command has been selected, such as a NEW document command, the user can productively use a computer utilizing a voice recognition program, such as a word processing program that types words responsive to the user's voice.

Precision in controlling the mouse which in turns controls positioning of the pointer is important. A graphics oriented operating system typically allows control or adjustments with respect to operation of the mouse for positioning of the pointer. For example, the pointer speed or sensitivity at which movement of the mouse corresponds to movement of the pointer can be adjusted. In addition, a pointer trail can be included with the pointer to highlight direction thereof on the display when the mouse is moved. Unfortunately, these options do not necessarily assist a user with poor hand motor skill control or poor eyesight. Therefore, there is a continuing need to provide a computer system that can be operated by a motion impaired user with limited hand motor skill control.

SUMMARY OF THE INVENTION

In view of the foregoing background, it is therefore an object of the present invention to provide a mouse that can be operated by a motion impaired user having limited hand motor skill control, and a corresponding method associated therewidth.

This and other objects, advantages and features in accordance with the present invention are provided by a computer system for a motion impaired user. The computer system includes a housing, a processor in the housing, and a display connected to the processor for displaying at least one menu of selectable commands arranged in a sequence. A mouse is connected to the processor for positioning a pointer on the display responsive to movement of the mouse. A mouse template preferably comprises at least one elongate body having a plurality of stations therealong corresponding to the sequence of selectable commands and cooperates with the mouse for assisting the motion impaired user so that when the mouse is positioned at a station, the pointer on the display is positioned at the corresponding selectable command of the at least one menu.

Each station of the mouse template preferably includes a recessed notch for receiving a mating portion of the mouse. The mating portion of the mouse slidably engages each respective station. The mouse and mouse template cooperate with each other so that when the mouse is positioned at a station, the pointer is positioned at the corresponding selectable command of the display menu. The pointer is advantageously positioned at the corresponding selectable command regardless of where the pointer may have been positioned. Accordingly, a motion impaired user can position the pointer to a desired selectable command by positioning the mouse to a corresponding station on the mouse template. Once the mouse is inserted into a station, the user simply selects a mouse button to select the corresponding selectable command.

The mouse template preferably further comprises a first pad portion adjacent the at least one elongate body and comprises a plurality of spaced apart tracks extending outwardly from respective stations. The mouse further comprises a guide for being slidably engaged within a track to guide the mouse therealong. The mouse template preferably further comprises a second pad portion adjacent the first pad portion having a substantially flat surface so that a non-motion impaired user can position the pointer in a desired location on the display.

Another aspect of the invention relates to a method for assisting a motion impaired user operating a computer system. The computer system comprises a housing, a processor in the housing and a display connected to the processor for displaying at least one menu of selectable commands arranged in a sequence. A mouse is connected to the processor. A mouse template preferably comprises at least one elongate body having a plurality of stations therealong corresponding to the sequence of selectable commands. The method preferably comprises the step of positioning the mouse to one of the plurality of stations so that the pointer on the display is positioned at a selectable command corresponding to the selected station.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

A mouse 20 and a mouse template 22 for assisting a computer user having poor or limited hand motor skill control for positioning a pointer 24 on a display 26 will be described with reference to FIGS. 1–4. The present invention is not limited to the type of computer system 28 in which the mouse 20 and mouse template 22 are used. A typical computer system 28 is a desktop computer comprising a housing 30, a processor 32 in the housing, and wherein the display 26 is connected to the processor for displaying at least one menu 34 of selectable commands 36a–36n arranged in a sequence.

Figure 1:
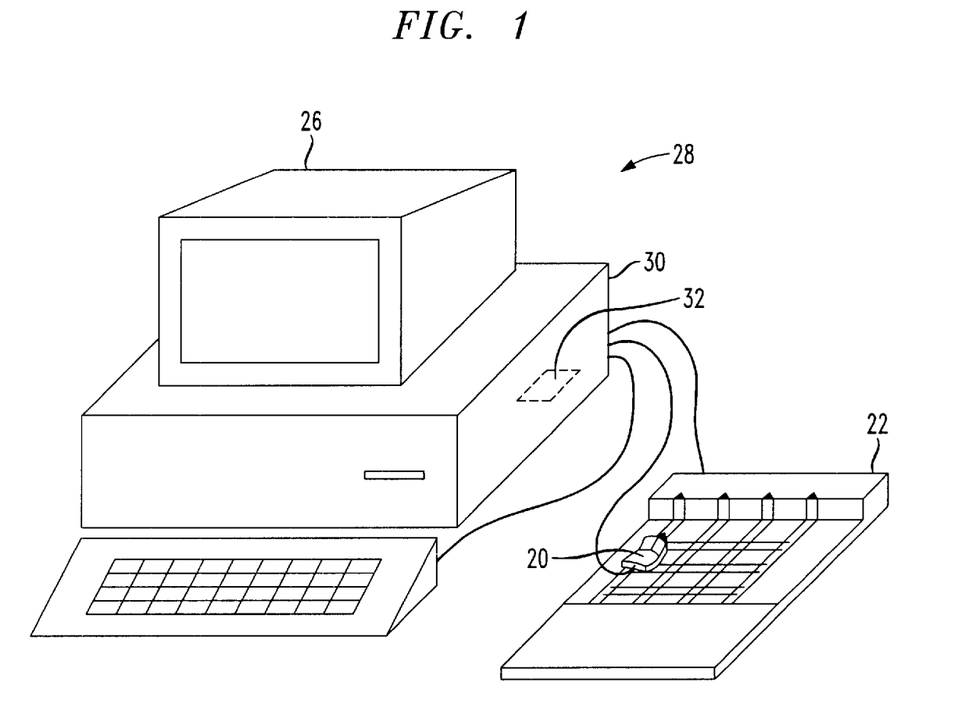
FIG. 1 is a perspective view of a computer system including a mouse and mouse template for a motion impaired user in accordance with the present invention.
Figures 2, 3:
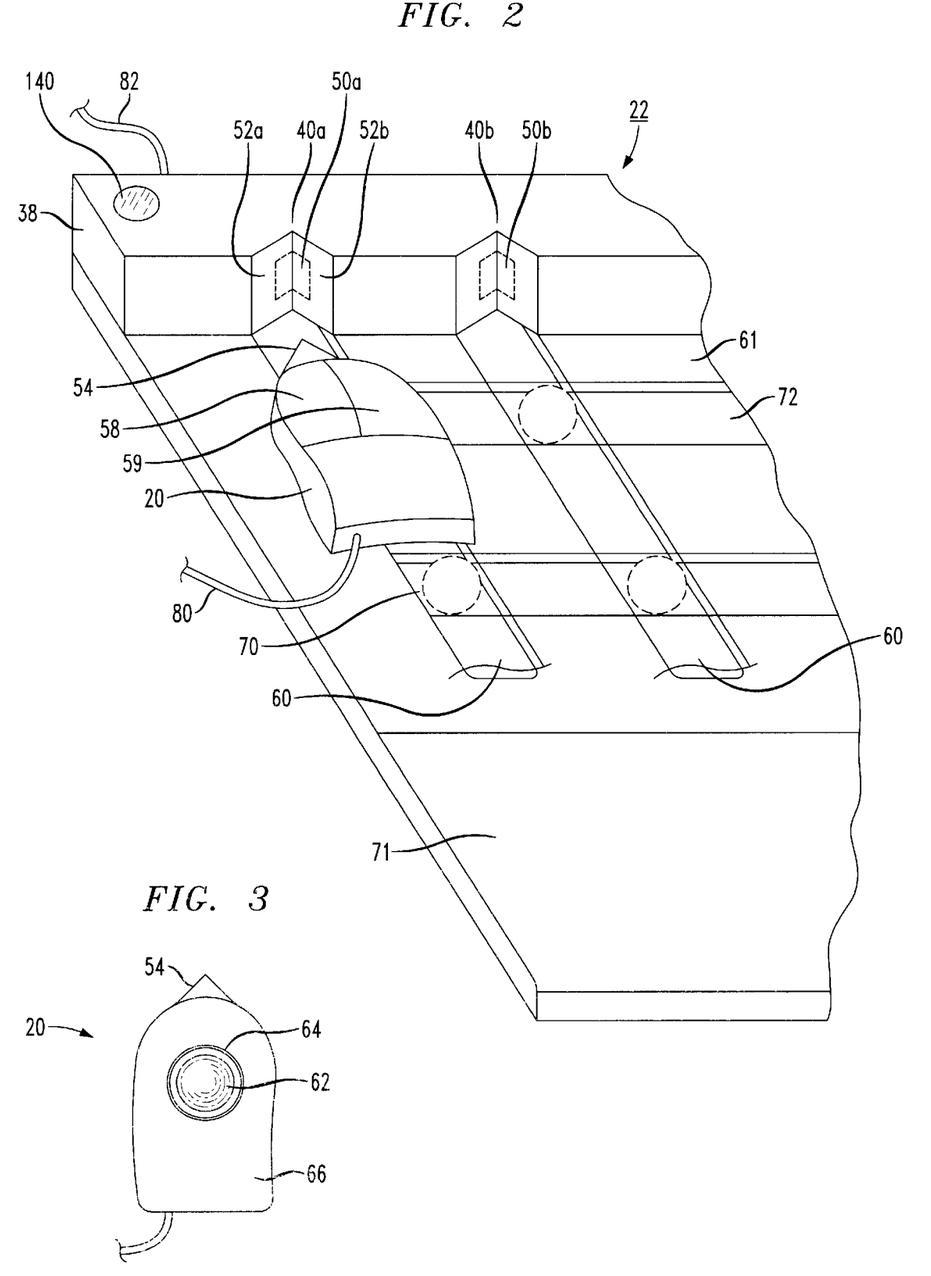
FIG. 2 is a more detailed perspective view of the mouse and mouse template in accordance with the present invention.
FIG. 3 is a bottom view of the mouse in accordance with the present invention.

The mouse 20 is connected to the processor 32 for positioning the pointer 24 on the display 26 responsive to movement of the mouse. The mouse template 22 comprises at least one elongate body 38 having a plurality of stations 40a–40n therealong corresponding to the sequence of selectable commands 36a–36n. The mouse 20 and mouse template 22 cooperate with each other so that when the mouse is positioned at station 40a, for example, the pointer 24 is positioned at the corresponding selectable command 36a of the display menu 32. The pointer 36 is advantageously positioned at the corresponding selectable command 36a regardless of where the pointer 24 may have been previously positioned.

Figure 4:
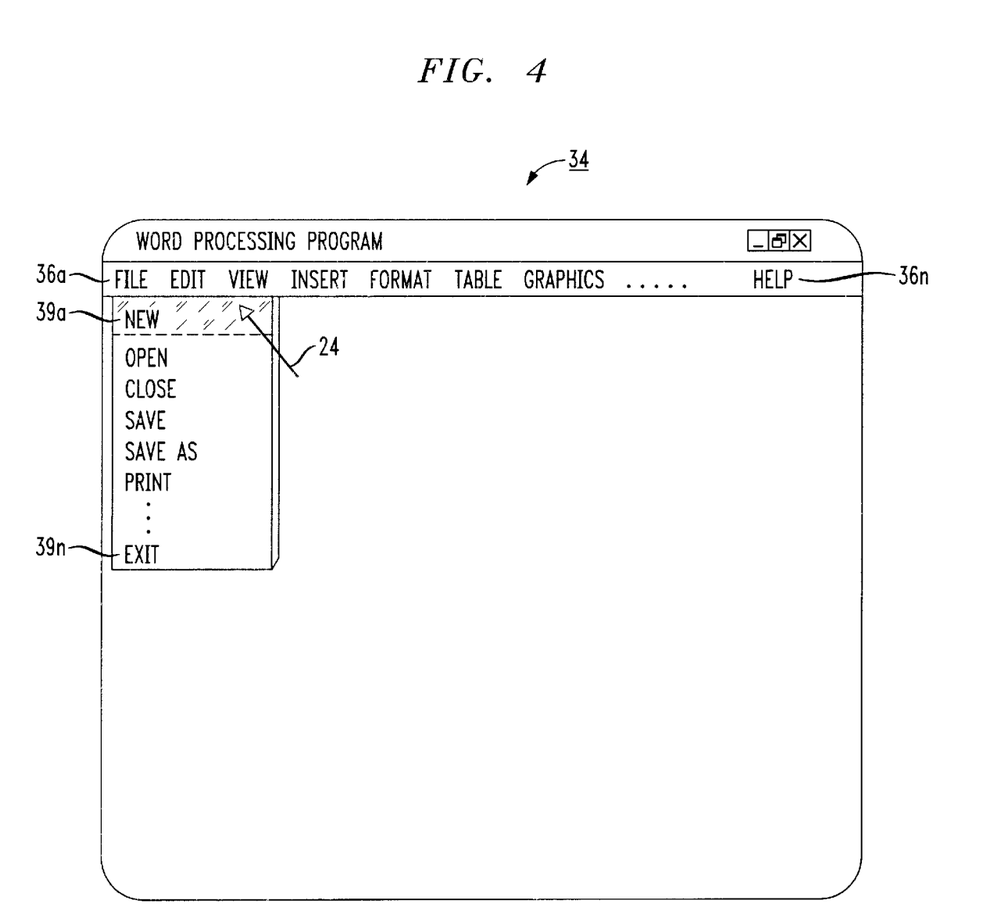
FIG. 4 is a view of a menu display of selectable commands in accordance with the present invention.

In one embodiment, the menu 34 of selectable commands 36a–36n arranged in a sequence correspond to a word processing program, such as Corel WordPerfect or Microsoft Word. Each of these programs continuously displays a menu of selectable commands. For example, Corel WordPerfect displays the following commands: FILE, EDIT, VIEW, FORMAT, TABLE, GRAPHICS . . . and HELP, as best shown in FIG. 4. Each of these commands, collectively referenced as 36a–36n, respectively correspond to one of the stations 40a–40n on the mouse template 22.

When the user slidably engages the mouse 20 so that it contacts station 40a, for example, the pointer 24 is positioned at selectable command 36a which corresponds to the FILE command. As will be explained in further detail below, positioning of the pointer 24 as a result of the mouse 20 and the mouse template 22 is independent of the word processing program. That is, spatial positioning of the selectable commands 36a–36n can be assigned to a respective station 40a–40n so that the mouse 20 and mouse template 22 can position the pointer 24 on the display 26 without the need for modifying the word processing program.

The menu 34 of selectable commands 36a–36n arranged in a sequence are not limited to any particular word processing program, and the selectable commands may even correspond to functions other than word processing commands. For example, the selectable commands may correspond to commands in a spread sheet or database program.

Interface between the mouse 20 and the mouse template 22 will now be discussed in greater detail, particulary with reference to FIGS. 2 and 3. The mouse template 22 includes at least one elongate body 38 having the plurality of stations 40a–40n therealong corresponding to the sequence of selectable commands 36a–36n. Each station 40a-40n comprises a sensor 50a–50n for sensing the mouse 20. In one embodiment, each sensor 50a–50n is a switch activated when the mouse 20 slidably engages a respective station 40a–40n. Other sensors are also contemplated by the invention.

To facilitate positioning of the mouse 20 at a desired station 40a–40n, the shape or contour of the station is opposite the shape or contour of the front or head portion of the mouse 20. For example, each station 40a–40n may have a tapered recess defined by surfaces 52a and 52b. The head or front portion of the mouse 20 includes an extension 54 energizing the recessed profile defined by surfaces 52a and 52b. Consequently, when the user positions the mouse 20 adjacent a desired station 40a, the extension 54 of the mouse 20 aides the user in making contact with the respective senor 50a.

Once contact has been made, the user depresses the left mouse button 58 for selecting the corresponding command. If the command corresponding to station 40a is a pull down menu command including a sequence of second selectable commands 39a–39n, as shown in FIG. 4, the user continues to depress the left mouse button 58 while dragging the mouse 20 in a downward direction. To facilitate the downward dragging of the mouse 20 to position the pointer 24 over a desired second command 39a–39n, the mouse template 22 further includes tracks 60 formed in a first pad portion 61 of the template. The tracks 60 are defined in a first direction, i.e., a vertical direction extending outwardly from the stations.

The mouse 20 further illustratively includes a guide 64 for guiding the mouse through the first trenches 60. In one embodiment, the guide 64 for the mouse 20 includes a circular extension or ring extending from the lower surface 66 of the mouse. The lower surface 66 is the surface in contact with the mouse template 22. The rotating ball 62 extends through the guide 64 similar to a typical mouse. The primary difference between the underside of the prior art mouse and the mouse 20 according to the present invention is the guide 64. Otherwise, the mouse 20 operates as a normal mouse when dragged through a track 60, wherein the ball 62 moves the pointer 24 on the display 26.

The guide 64 also includes tapered edges in contact with a track 60 to make it easier for sliding the mouse 20 track. Instead of the guide 64 being a circular extension, other shapes are acceptable, such as a partial circular extension or a single bar adjacent the ball 62, as readily appreciated by one skilled in the art.

To further aide the user in positioning the mouse 20 within a track 60 (such as in the form of a recess) so that the pointer 24 can be positioned at one of the second selectable commands 39a–39n corresponding to the FILE pull down menu 36a, dimples or recesses 70 are spaced apart in each track 60. Since the movement of the ball 62 and the pointer 24 is a linear relationship, positioning of the recesses 70 correlate to this linear relationship. The shape of each recess 70 corresponds to a shape of the guide 64. When the guide drops into a recess 70, the motion impaired user is made aware that the screen pointer 24 is adjacent a second selectable command 39a–39n, and can release the left mouse button 58 for selecting the corresponding selectable command. In another embodiment, horizontal tracks 72 are provided for moving the mouse 20 from one vertical track 60 to another vertical track. The horizontal tracks 72 are transverse to the vertical tracks 60.

A second pad portion 71 adjacent the first pad portion 61 does not include the vertical or horizontal tracks 60, 72. The second pad portion 71 allows a user having normal motor skill control to use the mouse 20 in a normal mode.

Figure 5:
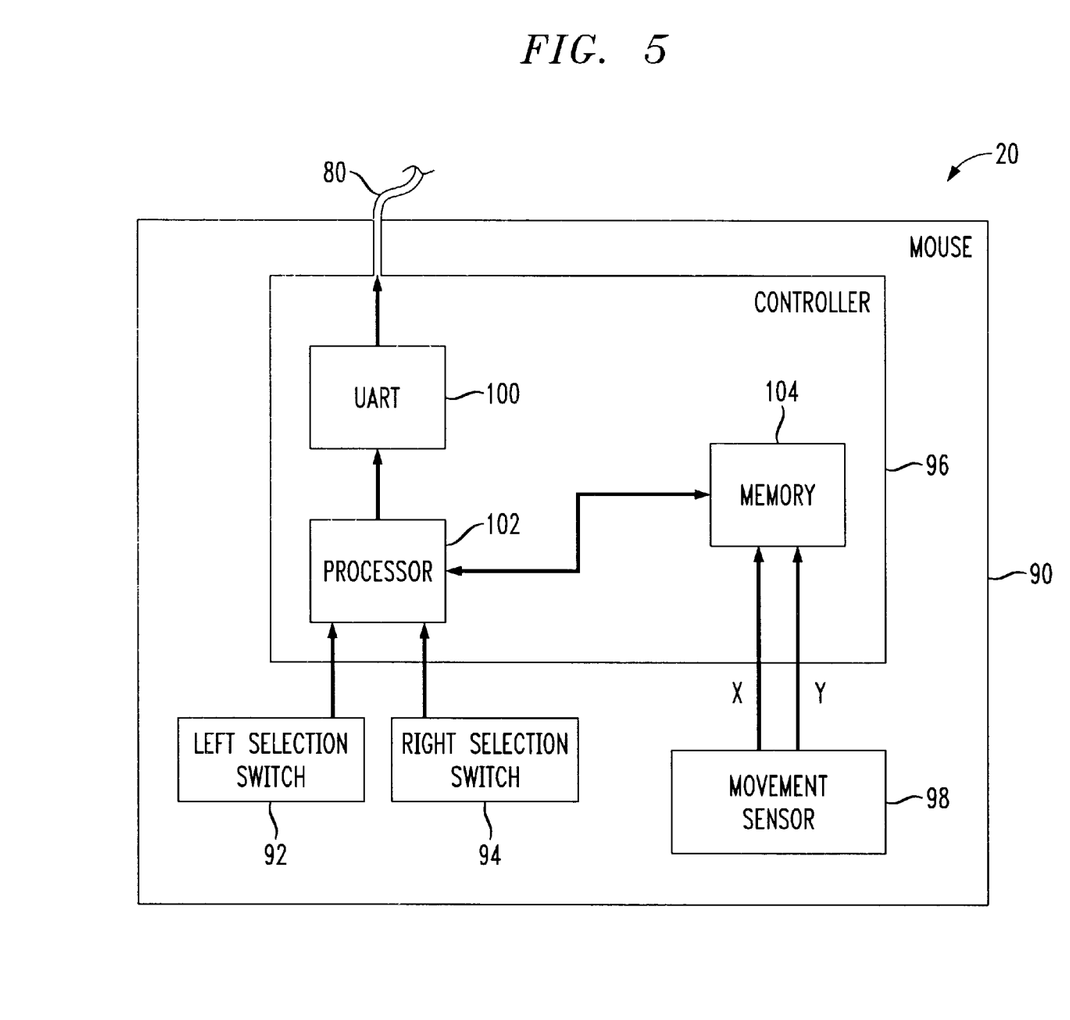
FIG. 5 is a block diagram of the mouse in accordance with the present invention.

As discussed above, the mouse 20 translates movement by the user into an electronic signal sent to the computer system 28 via a first communications link 80. The communications link 80 includes a cable connecting the mouse 20 to the computer housing 30. The cable is usually terminated within the mouse 20 and ends in a connector (not shown) that plugs into a corresponding connector at the back of the computer housing 30. Since the mouse 20 includes extension 54 at the head or front portion of the mouse, the cable is connected to the mouse from a location other than the extension, such as through the tail end of the mouse. This connector may be a serial nine pin or twenty-five pin connector typically used with PC compatible computers.

Figure 6:
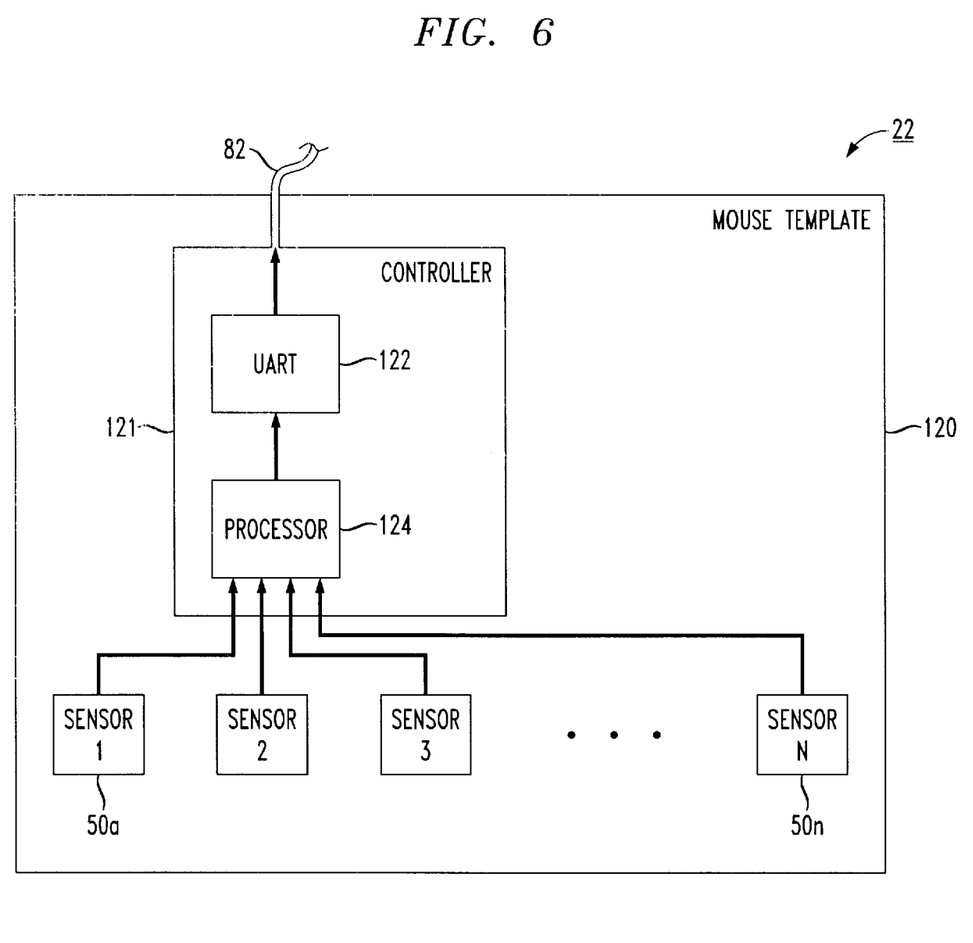
FIG. 6 is a block diagram of the mouse template in accordance with the present invention.

The mouse template 22 translates the actual position of the mouse 20 into an electronic signal sent to the computer system 28 via a second communications link 82. The second communications link 82 includes a cable connecting the plurality of stations 40a–40n of the elongate body 38 to the computer housing 30. The cable is usually terminated within the mouse template 22 and ends in a connector (not shown) that plugs into a corresponding connector at the back of the computer housing 30. As with the mouse connector, the mouse template connector may be a serial nine pin or twenty-five pin connector.

In an alternative embodiment, the respective cables from the mouse 20 and the mouse template 22 are joined together so that the two cables share a single connector. However, the mouse 20 and the mouse template 22 are not limited to any particular manner in which these two devices communicate with the computer processor 32. For example, the mouse 20 and the mouse template 22 may have an integrated transmitter that allows for wireless communication with a corresponding receiver of the computer system 28. Such a transmitter-receiver combination may provide radio frequency or optical communication, both of which are well known by one skilled in the art.

The mouse template 22 includes a housing 120, sensors 50a–50n, and controller 121 interfacing with each one of the sensors. In one embodiment, the controller 121 includes UART 122 and a processor 124. The processor 124 receives inputs from the sensors 50a–50n, and sends the data to the computer processor 32 from UART 122 via communications link 82. The controller 96 is not limited to having any particular processor 124 or UART 122. The controller 121 in one embodiment is an integrated circuit.

The movement sensor 98 is preferably provided by the rotating ball 62 and associated sensors for detecting movement of the mouse 20, and translates this movement to an electronic signal for transmission to the computer processor 32. In response to the signal, the computer processor 32 performs the function of moving the pointer 24 on the display 26 in a corresponding direction.

The controller 96 processes the signals sent by switches 92 and 94 for transmission to the computer processor 32 by a communications link 80. In one embodiment, the controller 96 includes a UART 100, a processor 102 and a memory 104. The processor 102 in coordination with the memory 104 receives and processes digital data, i.e., digital inputs from the switching mechanisms 92 and 94, and sends the data to the computer processor 32 from UART 100 via communications link 80. UART 100 is a Universal Asynchronous Receiver Transmitter, typically a chip device, that controls serial communication originating from and received by the controller 96. The memory 100 contains the firmware which controls the operation of the switching mechanisms 92 and 94 and the movement sensor 98. The controller 96 is not limited to having any particular processor 102, memory 104 or UART 100. The controller 96 in one embodiment is an integrated circuit.

The mouse template 22 includes a housing 120, sensors 50a–50n, and controller 120 interfacing with each one of the sensors. In one embodiment, the controller 120 includes UART 122 and a processor 124. The processor 124 receives inputs from the sensors 50a–50n, and sends the data to the computer processor 32 from UART 122 via communications link 82. The controller 96 is not limited to having any particular processor 124 or UART 122. The controller 120 in one embodiment is an integrated circuit.

Each sensor 50a–50n is activated in response to the mouse 20 being positioned in a predetermined location or station 40a–40n on the mouse template 22. The mouse 20 and the mouse template 22 thus coordinate with respect to each other for providing a command to the computer processor 32 as to where the pointer 24 is to be positioned, regardless of the current position of the pointer. The correlation between the position of the mouse 20 with a particular sensor 50a–50n and the position of the pointer 24 can be predefined because of the linear relationship between movement of the ball 62 and the pointer 24.

In other words, the desired coordinates of the pointer 24 with respect to the mouse 20 activating a particular sensor 50a–50n are predefined independent of the application displaying the menu 34 of selectable commands 36a–36n. Predefining a pointer 24 location for a predetermined position of the mouse 20 and mouse template 22 is readily understood by one skilled in the art. For example, advanced computer aided design (CAD) programs associate specific functions with respect to a specific location of the mouse regardless of where the pointer may be positioned. By modifying the driver of the mouse 20 and mouse template 22, positioning of the pointer 24 to predetermined locations corresponding to a selectable command 36a–36n is accomplished for assisting a motion impaired user in selecting a desired command.

Figure 7:
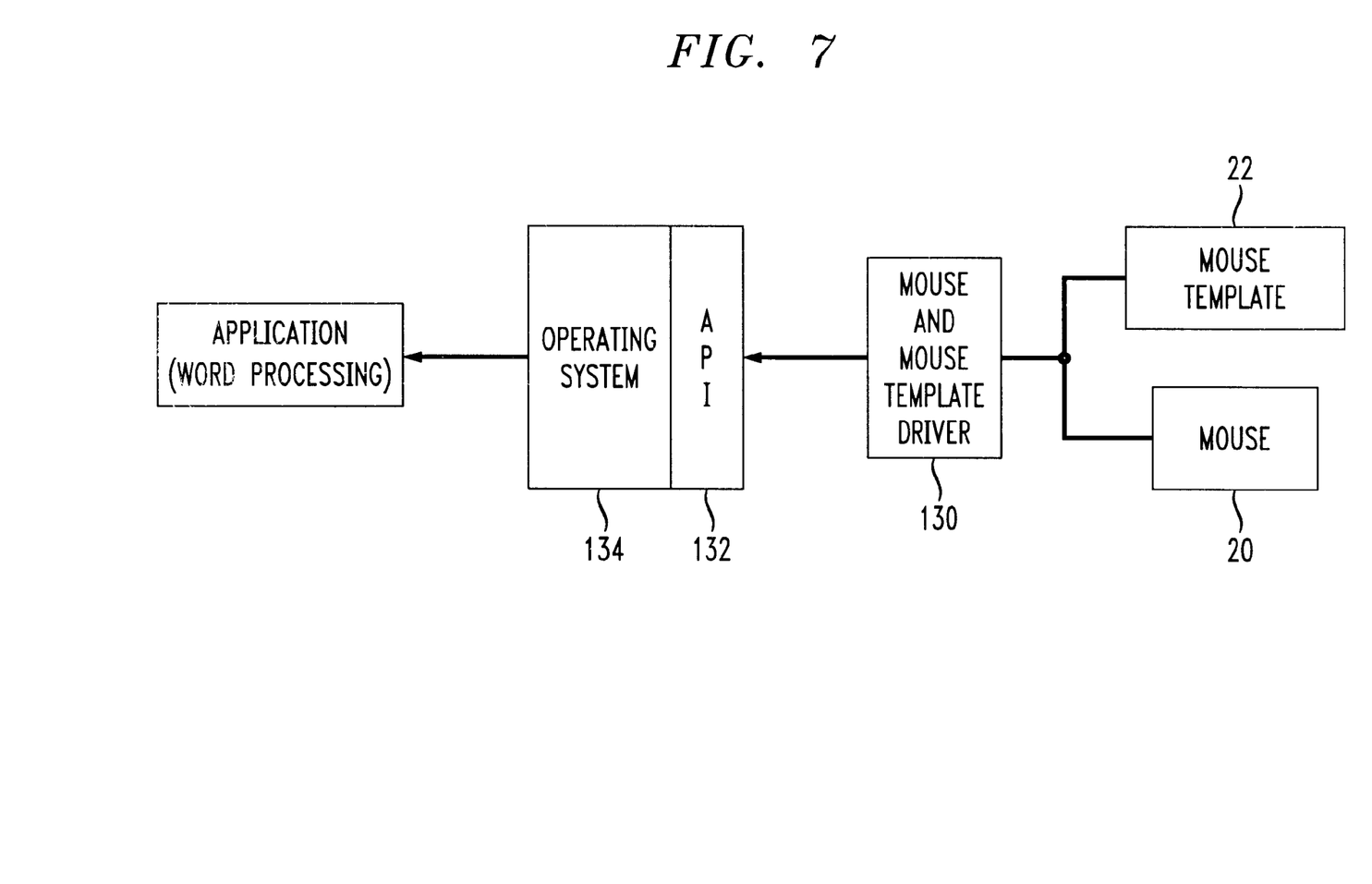
FIG. 7 is a block diagram of a mouse and mouse template driver interfacing an operating system of the computer system in accordance with the present invention.

Referring to FIG. 7, the interface between the operation system 134 of the computer system 28 and the mouse 20 and mouse template 22 will be discussed. The driver 130 typically includes three modules performing certain functions. A driver 130 for the mouse 20 and mouse template 22 includes an applications program interface (API) module for interfacing the API layer 132, which is part of the computer system 28. A second module of the driver 130 is an interrupt handler and data formatter. This module reads all interrupt data from the mouse 20 and mouse template 22 and converts it into a generic event. The event is then added to an event queue. A third module of the driver 130 contains all movement control variables, the event queues, and other control variables. Device dependencies include, but are not limited to data format and size, mouse type, e.g., serial, bus, etc., interrupt rates, number of buttons, number of stations, and/or method of disabling. Each part of the module dependent on the type of mouse attached and its hardware operating specifics are implemented in a convention manner as readily understood by one skilled in the art.

A further embodiment of the invention includes a speech message generator in the computer processor 32 and a speaker 140 in the mouse template 22 for communicating messages to the user corresponding to the first or second selectable command associated with the pointer 24. In other embodiments, the speaker 140 is separate from the mouse template 22. Programming voice responses in a sound card (not shown) corresponding to specific locations of the screen pointer 24 with respect to the mouse 20 and mouse template 22 is readily understood by one skilled in the art and will not be discussed in any further detail herein.

Another aspect of the invention relates to a method for assisting a motion impaired user operating a computer system 28 comprising a housing 30, a processor 32 in the housing, and a display 26 connected to the processor for displaying at least one menu 34 of selectable commands 36a–36n arranged in a sequence. A mouse 20 is connected to the processor 32. A mouse template 22 comprises at least one elongate body 38 having a plurality of stations 40a–40n therealong corresponding to the sequence of selectable commands. The method comprises the step of positioning the mouse 20 to one of the plurality of stations 40a–40n for communicating between the mouse and the mouse template 22 so that the pointer 24 is positioned at a selectable command corresponding to the selected station.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A computer system for a motion impaired user comprising:
    a housing;
    a processor in said housing;
    a display connected to said processor for displaying at least one menu of selectable commands arranged in a sequence;
    a mouse connected to said processor for positioning a pointer on said display responsive to movement of said mouse;
    a mouse template comprising at least one elongate body having a plurality of stations therealong corresponding to the sequence of selectable commands and cooperating with said mouse for assisting the motion impaired user so that when said mouse is positioned at a station the pointer on said display is positioned at the corresponding selectable command of the at least one menu;
    said mouse template further comprising a first pad portion adjacent said at least one elongate body and comprising a plurality of spaced apart tracks extending outwardly from respective stations; and
    said mouse further comprising a guide for being slidably engaged within a track to guide said mouse therealong.

2. A computer system according to claim 1, wherein each station comprises a sensor connected to said processor.

3. A computer system according to claim 1, wherein said mouse slidably engages each respective station.

4. A computer system according to claim 1, wherein said mouse comprises a switch for selecting the selectable command when said mouse is positioned at the station.

5. A computer system according to claim 1, wherein each station includes a recessed notch for receiving a mating portion of said mouse.

6. A computer system according to claim 1, wherein said mouse template further comprises a second pad portion adjacent said first pad portion having a substantially flat surface so that a non-motion impaired user can position the pointer in a desired location on said display.

7. A computer system according to claim 1, wherein said first pad portion of said mouse template further comprises a plurality of spaced apart second tracks extending transverse to the tracks extending outwardly from the respective stations.

8. A computer system according to claim 1, wherein each selectable command displays a pull down menu when selected and includes a sequence of second selectable commands; and wherein each track comprises a plurality of spaced apart recesses corresponding to the sequence of second selectable commands so that the pointer is positioned on said display at one of the second selectable commands corresponding to a recess.

9. A computer system according to claim 1, wherein said processor further comprises a speech message generator for communicating the selected command to the user.

10. A method for assisting a motion impaired user operating a computer system comprising a housing, a processor in the housing, a display connected to the processor for displaying at least one menu of selectable commands arranged in a sequence, a mouse connected to the processor, and a mouse template comprising at least one elongate body having a plurality of stations therealong corresponding to the sequence of selectable commands, the method comprising the step of:
    positioning the mouse to one of the plurality of stations for communicating between the mouse and the mouse template so that the pointer on the display is positioned at a selectable command corresponding to the selected station, wherein the mouse template further comprises a first pad portion adjacent the at least one elongate body and comprises a plurality of spaced apart tracks extending outwardly from respective stations; and wherein the mouse further comprises a guide for being slidably engaged within a track to guide the mouse therealong.

11. A method according to claim 10, wherein each station comprises a sensor connected to the processor for sensing the mouse.

12. A method according to claim 10, wherein positioning the mouse comprises slidably engaging the mouse with each respective station.

13. A method according to claim 10, wherein the mouse comprises a switch for selecting the selectable command when the mouse is positioned at the station.

14. A method according to claim 10, wherein each station includes a recessed notch for receiving a mating of the mouse.

15. A method according to claim 10, wherein the mouse template further comprises a second pad portion adjacent the first pad portion having a substantially flat surface so that a non-motion impaired user can position the pointer in a desired location on the display.

16. A method according to claim 10, wherein the first pad portion of the mouse template further comprises a plurality of spaced apart second tracks extending transverse to the tracks extending outwardly from the respective stations.

17. A method according to claim 10, wherein each selectable command displays a pull down menu when selected and includes a sequence of second selectable commands; and wherein each track comprises a plurality of spaced apart recesses corresponding to the sequence of second selectable commands so that the pointer is positioned on the display at one of the second selectable commands corresponding to a recess.

18. A method according to claim 11, wherein the processor further comprises a speech message generator for communicating the selected command to the user.

* * * * *